United States Patent
Lee

(10) Patent No.: US 7,177,640 B2
(45) Date of Patent: Feb. 13, 2007

(54) METHOD OF SCANNING CHANNEL OF DIGITAL TELEVISION

(75) Inventor: Young-jin Lee, Incheon Metropolitan (KR)

(73) Assignee: Samsung Electronics Co., Ltd., Gyeonggi-do (KR)

(*) Notice: Subject to any disclaimer, the term of this patent is extended or adjusted under 35 U.S.C. 154(b) by 197 days.

(21) Appl. No.: 10/898,962

(22) Filed: Jul. 27, 2004

(65) Prior Publication Data

US 2005/0054345 A1 Mar. 10, 2005

(30) Foreign Application Priority Data

Jul. 28, 2003 (KR) .................... 10-2003-0052085

(51) Int. Cl.
*H04Q 7/20* (2006.01)
(52) U.S. Cl. .............. 455/434; 455/422.1; 455/32.1; 455/515; 455/182.3; 455/119; 348/732; 348/727
(58) Field of Classification Search ............... 455/434, 455/422.1, 32.1, 515, 182.3, 182.2; 348/732, 348/731, 727, 725
See application file for complete search history.

(56) References Cited

U.S. PATENT DOCUMENTS

| | | | |
|---|---|---|---|
| 6,115,080 A | 9/2000 | Reitmeier | |
| 6,369,857 B1 | 4/2002 | Balaban et al. | |
| 6,577,353 B1 | 6/2003 | Welles, II et al. | |
| 2002/0097344 A1* | 7/2002 | Shibusawa | 348/731 |
| 2003/0073459 A1* | 4/2003 | Chatelier et al. | 455/553 |

FOREIGN PATENT DOCUMENTS

| | | |
|---|---|---|
| JP | 2001-230689 A | 8/2001 |
| JP | 2001-309259 A | 11/2001 |
| JP | 2002-374467 A | 12/2002 |
| KR | 000034319 A | 6/2000 |
| KR | 000046171 A | 7/2000 |
| KR | 2001-0051645 A | 6/2001 |
| KR | 2001-0089119 A | 9/2001 |
| KR | 20-0313019 YI | 5/2003 |
| WO | WO 97/08861 A1 | 3/1997 |
| WO | WO 99/55087 A1 | 10/1999 |
| WO | WO 02/063866 A2 | 8/2002 |

* cited by examiner

*Primary Examiner*—George Eng
*Assistant Examiner*—Khai Nguyen
(74) *Attorney, Agent, or Firm*—Sughrue Mion, PLLC

(57) ABSTRACT

A method of scanning channels in a digital television including (a) setting a starting frequency; (b) searching for a first available digital channel by searching a search frequency that is the starting frequency; adding a predetermined scan step to said search frequency if the first available channel is not found at the starting frequency, and adding additional predetermined scan steps to the search frequency until the first available channel is found if the first available channels is not found at the starting frequency plus the scan step; and (c) searching for a second available digital channel by searching at a first main frequency, which is the first available channel frequency plus a first predetermined bandwidth, wherein the step of searching for the second available digital channel includes searching at a plurality of scan steps around the first main frequency.

14 Claims, 3 Drawing Sheets ically, to a method of scanning channels in a digital television. The method includes setting a starting frequency of an initial digital channel and scanning at different bandwidths for available broadcasting channels.

METHOD OF SCANNING CHANNEL OF DIGITAL TELEVISION

BACKGROUND OF THE INVENTION

This application claims the priority of Korean Patent Application No. 03-52085, filed on Jul. 28, 2003 in the Korean Intellectual Property Office, the disclosure of which is incorporated herein in its entirety by reference.

FIELD OF THE INVENTION

The present invention relates to a method of operating a digital broadcasting receiver, and more particularly, to a method of scanning channels in a digital television. The method includes setting a starting frequency of an initial digital channel and scanning at different bandwidths for available broadcasting channels.

DESCRIPTION OF THE RELATED ART

Digital video broadcasting (DVB) is a standard of digital broadcasting commonly being developed by European countries, by which a digital television receives broadcasting transmitted digitally. Generally, the digital broadcasting receiver receives various frequency bands, that is, a plurality of broadcasting channels, and synchronizes a tuner of the digital television to a main frequency of the bandwidth, signals of which will be received, in order to receive the signals of the corresponding frequency band.

When digital broadcasting and analog broadcasting simultaneously take place, the digital broadcasting signals are sent at predetermined frequencies that are offset in order to be less affected by a neighboring channel that may include picture carriers of analog broadcasting. A receiving end of the receiver scans the channels in consideration of the transmitted frequency offset. However, since the frequency offset is different in different countries, available channels can be missed due to the frequency offset that is used when the channels are scanned.

In Europe, a continent where a plurality of broadcasting methods are performed, whether a 7 MHz or an 8 MHz channel bandwidth is being used in the initial scanning operation should be considered. Also, even though the bandwidth is considered in the initial scanning operation, there is a disadvantage in which the frequency offset needs to be identified in order to scan the available channels.

SUMMARY OF THE INVENTION

The present invention provides a method of scanning channels in a digital television, which sets a starting frequency of an initial digital channel and automatically scans available broadcasting channels that are transmitted differently according to bandwidths of the frequencies.

According to an aspect of the present invention, there is provided a method of scanning channels, which is an operating method of a digital broadcasting receiver, including: (a) setting a starting frequency; (b) searching for a first available digital channel by searching a search frequency that is the starting frequency, adding a predetermined scan step to said search frequency if the first available channel is not found at the starting frequency, and adding additional predetermined scan steps to the search frequency until the first available channel is found if the first available channel is not found at the starting frequency plus the scan step; and (c) searching for a second available digital channel by searching at a first main frequency, which is the first available channel frequency plus a first predetermined bandwidth, wherein the step of searching for the second available digital channel includes searching at a plurality of scan steps around the first main frequency.

The scan step may be a minimum unit of frequency generated by a local oscillator disposed in a tuner of the digital broadcasting receiver.

The searching at a plurality of scan steps around the first main frequency of step (c) can include searching at the first main frequency−2×(the minimum unit of frequency generated by the local oscillator), searching at the first main frequency−the minimum frequency unit generated by the local oscillator, searching at the first main frequency, searching at the first main frequency+the minimum frequency unit generated by the local oscillator, and searching at the first main frequency+2×(the minimum frequency unit generated by the local oscillator).

The method can also include repeatedly searching for a next available digital channel until all available channels are scanned in the broadcasting frequency band, wherein the search for the next available channel includes searching at a plurality of scan steps around the previously found available channel frequency plus the predetermined first bandwidth.

According to another aspect of the invention, if said second available channel is found, the method further includes repeatedly searching for a next available digital channel until all available channels are scanned in the broadcasting frequency band, wherein the search for the next available channel includes searching at a plurality of scan steps around a frequency of a previously found available channel frequency plus the predetermined first bandwidth; and if a second available channels is not found, the method further includes searching for the second available digital channel by searching at a second main frequency, which is the first available channel frequency plus a predetermined second bandwidth, wherein the step of searching for the second available digital channel includes searching at a plurality of scan steps around the second main frequency.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE PREFERRED EMBODIMENT

Figure 1:
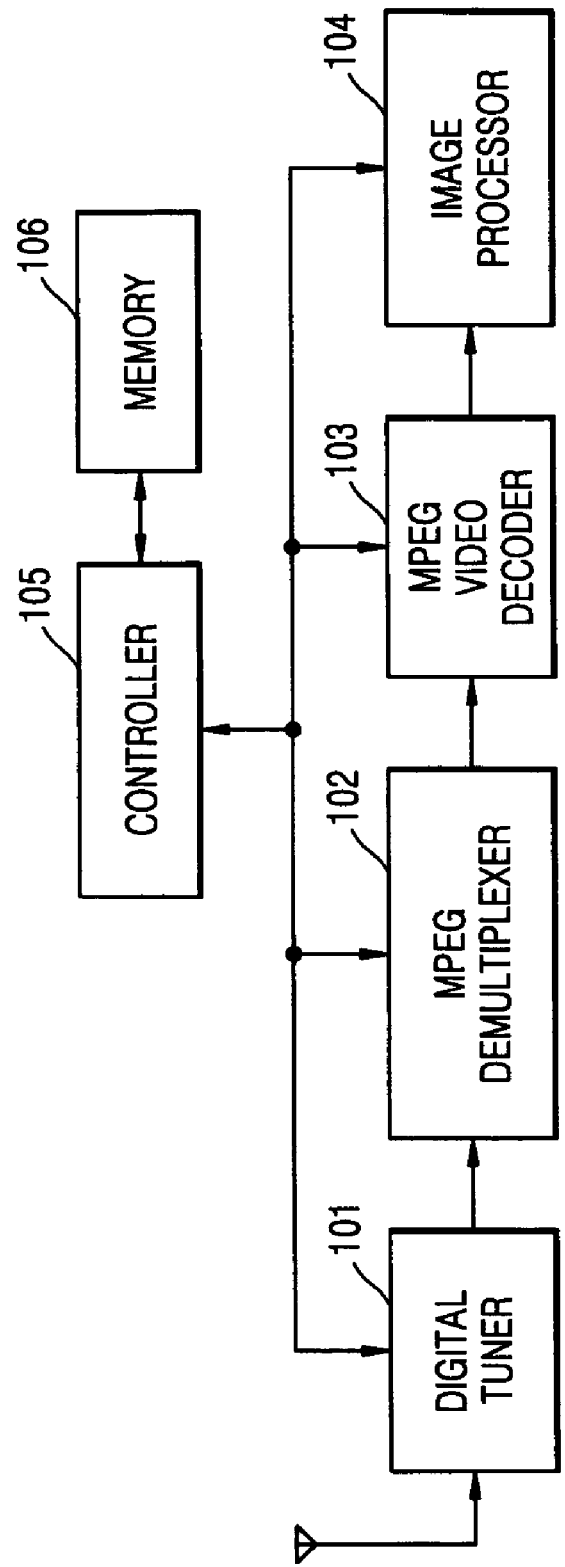
FIG. 1 is a block diagram of a channel scan device of a digital television.

FIG. 1 is a block diagram of a channel scan device of a digital television. A channel scan device of the present invention includes a digital tuner 101, a motion picture experts group (MPEG) demultiplexer 102, an MPEG decoder 103, an image processor 104, a controller 105, and a memory 106.

Figure 2A:
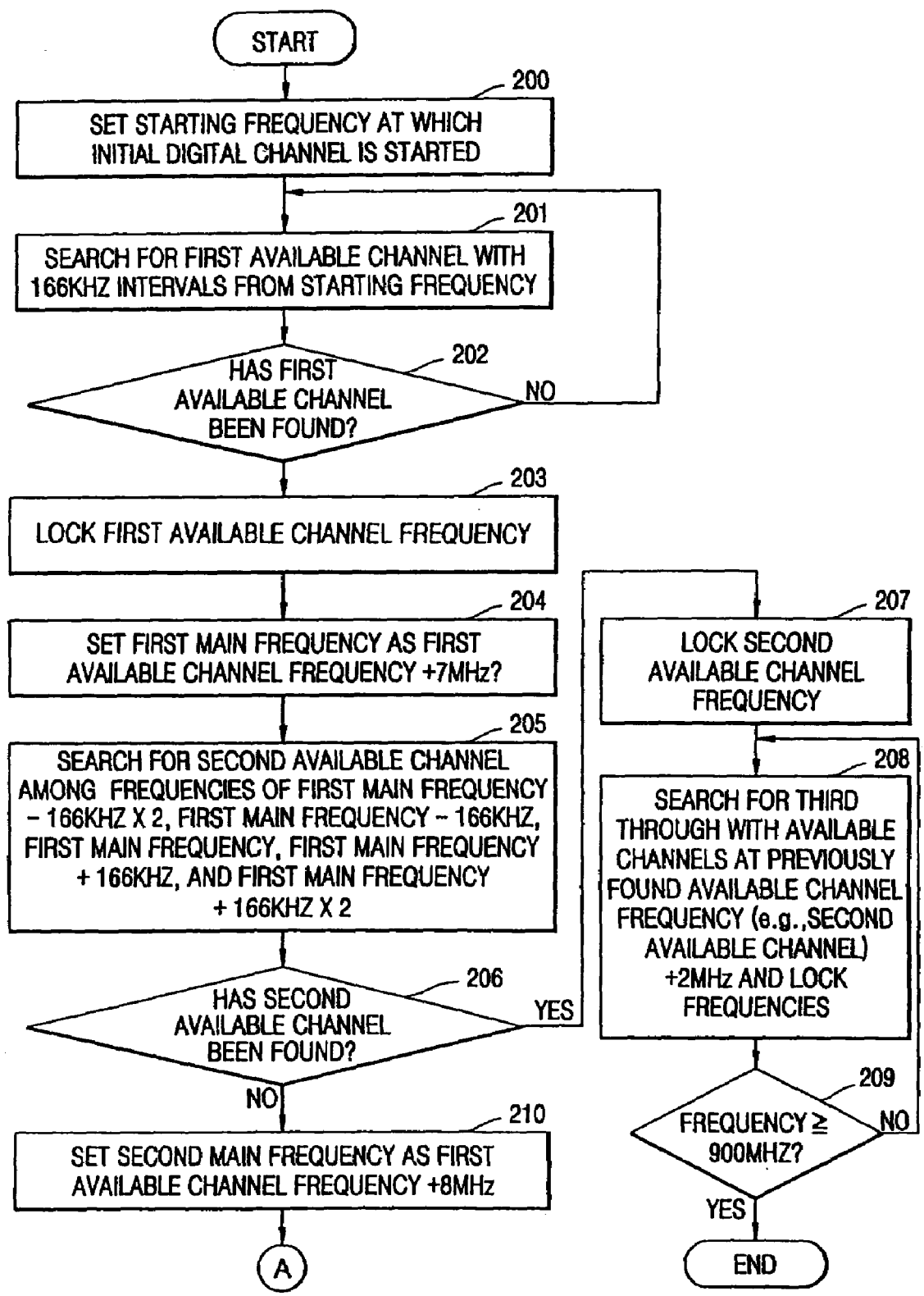
FIGS. 2A and 2B are flow charts of a method of scanning channels in the digital television according to the present invention.
Figure 2B:
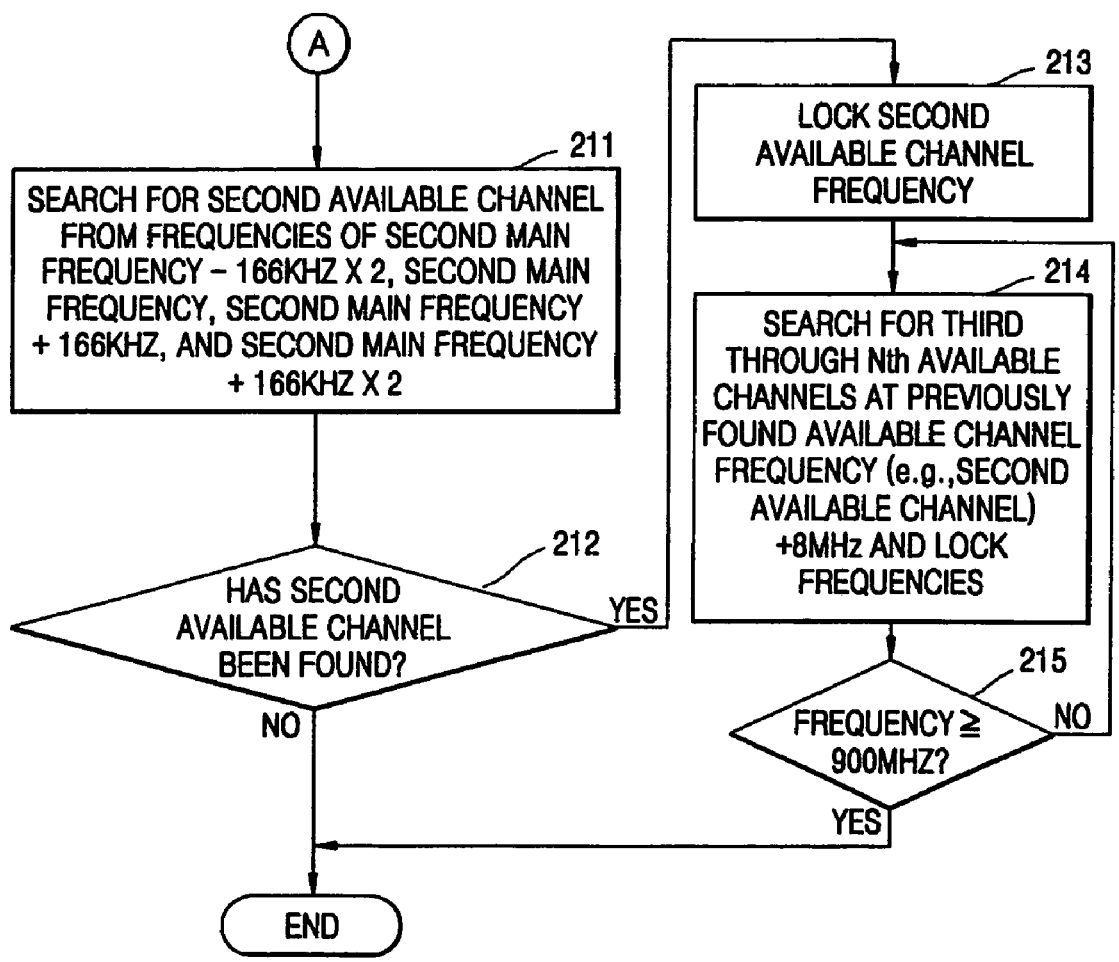

FIGS. 2A and 2B are flow charts of a method of scanning channels in a digital television according to a preferred embodiment of the present invention. The method of scanning channels according to the present invention includes setting a starting frequency at which an initial digital channel is started (200), searching for a first available channel at 166 KHz intervals from the starting frequency (201), deciding whether the first available channel has been found (202), and locking the frequency at which the first available channel is found (203).

Next, the preferred embodiment includes searching for a second available channel at a frequency 7 MHz higher than the frequency at which the first available channel is locked (204). A first main frequency is set as the first available channel frequency plus 7 MHz. The search includes first, searching for the second available channel at a frequency of the first main frequency−2×166 KHz, second, searching for an available channel at the first main frequency−166 KHz, third, searching for an available channel at the first main frequency, fourth, searching for an available channel at the first main frequency+166 KHz, and fifth, searching for an available channel at the first main frequency+2×166 KHz (205). If the second available channel has been found (206), then the frequency at which the second available channel is found is locked (207).

Then, the method includes searching for third through Nth available digital channels until all available channels are scanned in the broadcasting frequency band. The search for the next available channel includes searching at a plurality of scan steps around the previously found available channel frequency (in this case, the second available channel)+7 MHz, and locking the frequencies (208) in the manner discussed above with respect to the second available channel. If the searched frequency is 900 MHz or larger (209), then the scanning process is terminated.

If the second available channel is not found by searching at the first available channel plus 7 MHz, then the method of searching for the second available channel also includes searching at the first available channel frequency+8 MHz (210) by setting the first available channel frequency+8 MHz as a second main frequency. The method includes first, searching for the second available channel at a frequency of the second main frequency−2×166 KHz, second, searching for an available channel at the second main frequency−166 KHz, third, searching for an available channel at the second main frequency, fourth, searching for an available channel at second main frequency+166 KHz, and fifth, searching for an available channel at second main frequency 2×166 KHz (211). If the second available channel has been found (212), then the frequency at which the second available channel is found (213) is locked.

Then, the method includes searching for third through Nth available channels at intervals of 8 MHz from the locked second available channel frequency and locking the frequencies (214) in the manner discussed above with respect to the second available channel. If the searched frequency is 900 MHz or larger (215), then the scanning process is terminated.

The present invention will be described in more detail with reference to FIGS. 1, 2A, and 2B.

The digital tuner 101 selects and demodulates the digital broadcasting signals.

The MPEG demultiplexer 102 demultiplexes a transport stream which is made by multiplexing audio signals, video signals, and additional information.

The MPEG decoder 103 decodes the video signal in the output signal of the MPEG demultiplexer 102.

The image processor 103 converts a YUV signal of the channel selected by the digital tuner 101 into RGB and Y/C signals.

The controller 105 fully controls the digital broadcasting signal processes, and specifically, controls a channel scanning process.

The memory stores the data, and more particularly, stores the channel scanning algorithm of the present invention and the locked channel frequencies.

The channel scanning method between the digital tuner 101 and the controller 105 will be described with reference to FIGS. 2A and 2B.

The controller 105 sets the starting frequency to where the initial digital channel is started (200). For example, in Europe, the channel bandwidth is set to 7 MHz or 8 MHz. However, when it is not known which of these bandwidths is set, the scanning operation is performed only with the starting frequency information. Generally, the broadcasting frequency is in a range of 470 MHz to 862 MHz of ultra high frequency (UHF), and the controller 105 sets the frequency at 470 MHz, a frequency at which the initial digital channel search is started.

When the starting frequency is set, the controller 105 searches for the first available channel by searching at scan step units around the starting frequency (step 201). The first available channel is searched by the controller 105 by moving from the starting frequency 470 MHz at 166 KHz scan steps. The scan step (166 KHz) is the minimum unit of a local oscillating frequency, which is generated by a local oscillator (not shown) disposed in the tuner 101. For the described embodiment, it will be assumed that the first available channel, No. 21, is the frequency of 474 MHz.

When the first available channel is found, the controller 105 locks the first available frequency as the frequency at which the first available channel is found and stores the locked frequency in the memory 106 (step 203).

According to the preferred embodiment, the controller 105 searches for the second available channel at a frequency 7 MHz above the locked first available channel frequency (step 204).

The controller 105 sets a first main frequency as the first available channel frequency+7 MHz, and searches for available channels by searching first through fifth scan steps around the first main frequency (step 205). As described above, the scan step is the minimum unit (166 KHz) of the local oscillating frequency generated by the local oscillator (not shown) disposed in the tuner 101. The search begins at the first main frequency−2×166 KHz (i.e., the first main frequency−2 scan steps). Second, a scan step is added so that the search continues at the first main frequency−166 KHz. Third, another scan step is added to the searched frequency, and the first main frequency is searched. Fourth, a scan step is added, and the first main frequency+166 KHz is searched. Fifth, a scan step is added, and the first main frequency+2×166 KHz is searched. Therefore, the controller 105 searches for the second available channel at the first main frequency−2×166 KHz, the first main frequency−166 KHz, the first main frequency, the first main frequency+166 KHz, and the first main frequency+2×166 KHz. For example, when it is assumed that the first available channel is found at 474 MHz, the controller 105 sets 474 MHz+7 MHz=481 MHz as the first main frequency, and searches for the second available channel from 481 MHz−332 KHz, 481 MHz−166 KHz, 481 MHz, 481 MHz+166 KHz, and 481 MHz+332 KHz.

When the second available channel is found by applying the first through fifth scan steps to the first main frequency, the controller 105 locks the second available channel frequency as the frequency at which the available channel is found and stores the frequency in the memory 106 (step 207).

In addition, the controller 105 searches for third through Nth available channels by applying the first through fifth scan steps to a previously found available channel frequency (e.g., the second available channel)+7 MHz, and locks the found available channels (step 208).

When the frequency of 900 MHz or greater is found, the controller 105 decides that the frequency is an abnormal broadcasting signal frequency band and terminates the scanning process (step 209).

However, if the second available channel is not found by searching around the first available channel frequency+7 MHz, the controller 105 searches around the first available channel frequency+8 MHz (step 210). Although in the present preferred embodiment, the searching bandwidth is limited to 7 MHz and 8 MHz, the bandwidth may be different for each country.

The controller 105 sets a second main frequency as the first available channel frequency+8 MHz, and searches for available channels by searching the first through fifth scan steps around the second main frequency (step 211). Again, the scan step is the minimum unit (166 KHz) of the local oscillating frequency generated by the local oscillator (not shown) disposed in the tuner 101. The search begins at the second main frequency−2×166 KHz (i.e., the second main frequency−2 scan steps). Second, another scan step is added so that the search continues at the second main frequency−166 KHz. Third, a scan step is added and the second main frequency is searched. Fourth, a scan step is added, and the second main frequency−166 KHz is searched. Fifth, a scan step is added, and the second main frequency+2×166 KHz is searched. Therefore, the controller 105 searches for the available channel at the second main frequency−2×166 KHz, the second main frequency−166 KHz, the second main frequency, the second main frequency+166 KHz, and the second main frequency+2×166 KHz. For example, when it is assumed that the first available channel is found at 474 MHz, the controller 105 sets 474 MHz+8 MHz=482 MHz as the first main frequency, and searches for the second available channel from 482 MHz−332 KHz, 482 MHz−166 KHz, 482 MHz, 482 MHz+166 KHz, and 482 MHz+332 KHz.

When the second available channel is found by applying the first through fifth scan steps to the second main frequency, the controller 105 locks the second available channel frequency as the frequency at which the available channel is found and stores the frequency in the memory 106 (step 213).

In addition, the method includes searching for third through Nth available digital channels until all available channels are scanned in the broadcasting frequency band. The search for the next available channel includes searching at a plurality of scan steps around the previously found available channel frequency (in this case, the second available channel)+8 MHz, and locking the frequencies (214). The searching around the previously found available channel frequency+8 MHz includes applying the first through fifth scan steps discussed above with respect to the search for the second available channel.

When the frequency of 900 MHz or greater is found, the controller 105 decides that the frequency is an abnormal broadcasting signal frequency band and terminates the scanning process (step 215).

As described above, according to the present invention, when the frequency value, at which the initial digital channel is started, is set, the scanning process can be performed with a single algorithm, without applying different algorithms to the channel scanning operations of various countries, and all channels can be scanned.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of scanning channels, which is a method of operating a digital broadcasting receiver, comprising:
   (a) setting a starting frequency;
   (b) searching for a first available digital channel by searching a search frequency that is the starting frequency, adding a predetermined scan step to said search frequency if the first available channel is not found at the starting frequency, and adding additional predetermined scan steps to the search frequency until the first available channel is found if the first available channel is not found at the starting frequency plus the scan step;
   (c) searching for a second available digital channel by searching at a first main frequency, which is the first available channel frequency plus a first predetermined bandwidth;
   (d) searching for the second available digital channel at a second main frequency, which is the first available channel frequency plus a second bandwidth that is different from said first predetermined bandwidth, if no second available digital channel is found by searching at the first main frequency; and
   (e) repeatedly searching for next available digital channels using the first main frequency if said second available channel is found using said first main frequency, and using the second main frequency if said second available channel is found using said second main frequency.

2. The method of claim 1, wherein each scan step is a minimum unit of frequency generated by a local oscillator disposed in a tuner of the digital broadcasting receiver.

3. The method of claim 1, further comprising repeatedly searching for a next available digital channel until all available channels are scanned in the broadcasting frequency band, wherein the search for the next available channel includes searching at a plurality of scan steps around the previously found available channel frequency plus one of the predetermined first bandwidth and the second bandwidth.

4. The method of claim 1,
   wherein if said second available channel is found, the method further comprises repeatedly searching for a next available digital channel until all available channels are scanned in the broadcasting frequency band, wherein the search for the next available channel includes searching at a plurality of scan steps around a frequency of a previously found available channel frequency plus the predetermined first bandwidth; and
   wherein if a second available channel is not found, the method further comprises searching for the second available digital channel by searching at the second main frequency, which is the first available channel frequency plus a predetermined second bandwidth, wherein the step of searching for the second available digital channel includes searching at a plurality of scan steps around the second main frequency.

5. The method of claim 4, wherein if said second available channel is found, the method further comprises repeatedly searching for a next available digital channel until all available channels are scanned in the broadcasting frequency band, wherein the search for the next available channel includes searching at a plurality of scan steps around a frequency of a previously found available channel plus the predetermined first bandwidth.

6. The method of claim 4, wherein each scan step is a minimum unit of frequency generated by a local oscillator disposed in a tuner of the digital broadcasting receiver.

7. The method of claim 4, wherein if the main frequency is equal to or greater than a predetermined maximum frequency, then the scanning method is terminated.

8. The method of claim 1, wherein if the main frequency is equal to greater than a predetermined maximum frequency, then the scanning method is terminated.

9. A method of scanning channels, which is a method of operating a digital broadcasting receiver, comprising:
  (a) setting a starting frequency;
  (b) searching for a first available digital channel by searching a search frequency that is the starting frequency, adding a predetermined scan step to said search frequency if the first available channel is not found at the starting frequency, and adding additional predetermined scan steps to the search frequency until the first available channel is found if the first available channel is not found at the starting frequency plus the scan step: and
  (c) searching for a second available digital channel by searching at a first main frequency, which is the first available channel frequency plus a first predetermined bandwidth, wherein the step of searching for the second available digital channel includes searching at a plurality of scan steps around the first main frequency,
  wherein each scan step is a minimum unit of frequency generated by a local oscillator disposed in a tuner of the digital broadcasting receiver, and
  wherein the searching at a plurality of scan steps around the first main frequency of step (c) includes searching at the first main frequency minus (2 multiplied-by a minimum unit of frequency generated by the local oscillator), searching at the first main frequency minus the minimum frequency unit generated by the local oscillator, searching at the first main frequency, searching at the first main frequency plus the minimum frequency unit generated by the local oscillator, and searching at the first main frequency plus (2 multiplied-by the minimum frequency unit generated by the local oscillator).

10. The method of claim 9, wherein if the main frequency is equal to or greater than a predetermined maximum frequency, then the scanning method is terminated.

11. A method of scanning channels, which is a method of operating a digital broadcasting receiver, comprising:
  (a) setting a starting frequency;
  (b) searching for a first available digital channel by searching a search frequency that is the starting frequency, adding a predetermined scan step to said search frequency if the first available channel is not found at the starting frequency, and adding additional predetermined scan steps to the search frequency until the first available channel is found if the first available channel is not found at the starting frequency plus the scan step; and
  (c) searching for a second available digital channel by searching at a first main frequency, which is the first available channel frequency plus a first predetermined bandwidth, wherein the step of searching for the second available digital channel includes searching at a plurality of scan steps around the first main frequency,
  wherein if said second available channel is found, the method further comprises repeatedly searching for a next available digital channel until all available channels are scanned in the broadcasting frequency band, wherein the search for the next available channel includes searching at a plurality of scan steps around a frequency of a previously found available channel frequency plus the predetermined first bandwidth;
  wherein if a second available channel is not found, the method further comprises searching for the second available digital channel by searching at a second main frequency, which is the first available channel frequency plus a predetermined second bandwidth, wherein the step of searching for the second available digital channel includes searching at a plurality of scan steps around the second main frequency;
  wherein if said second available channel is found, the method further comprises repeatedly searching for a next available digital channel until all available channels are scanned in the broadcasting frequency band, wherein the search for the next available channel includes searching at a plurality of scan steps around a frequency of a previously found available channel plus the predetermined first bandwidth; and
  wherein the searching at a plurality of scan steps around the first main frequency includes searching at the first main frequency minus 2 times a minimum unit of frequency generated by the local oscillator, searching at the first main frequency minus the minimum frequency unit generated by the local oscillator, searching at the first main frequency, searching at the first main frequency plus the minimum frequency unit generated by the local oscillator, and searching at the first main frequency plus 2 multiplied-by the minimum frequency unit generated by the local oscillator, and
  wherein the searching at a plurality of scan steps around the second main frequency includes searching at the second main frequency minus 2 times the minimum unit of frequency generated by the local oscillator, searching at the second main frequency minus the minimum frequency unit generated by the local oscillator, searching at the second main frequency, searching at the second main frequency plus the minimum frequency unit generated by the local oscillator, and searching at the second main frequency plus 2 times the minimum frequency unit generated by the local oscillator.

12. A method of scanning channels, which is a method of operating a digital broadcasting receiver, comprising:
  (a) setting a starting frequency;
  (b) searching for a first available digital channel by searching a search frequency that is the starting frequency plus a predetermined scan step and by adding additional predetermined scan steps to the searched frequency until the first available channel is found;
  (c) searching for a second available digital channel by searching at a first main frequency, which is the first available channel frequency plus a predetermined bandwidth,
  (d) if the second available channel is not found in step (c), searching at a second main frequency, which is the first available channel frequency plus a second predetermined bandwidth,
  (e) repeatedly searching for next available digital channels using the first main frequency if said second available channel is found using said first main frequency, and using the second main frequency if said second available channel is found using said second main frequency.

13. The method of claim 12,
wherein if said second available channel is found by searching the first main frequency, the method further comprises repeatedly searching for the next available digital channels until all available channels are scanned in the broadcasting frequency band by searching at a frequency of a previously found available channel frequency plus the predetermined first bandwidth; and wherein if a second available channel is found by searching the second main frequency, the method further comprises repeatedly searching for the next available digital channels until all available channels are scanned in the broadcasting frequency band, wherein the search for the next available channels includes searching at a plurality of scan steps around a frequency of a previously found available channel plus the predetermined second bandwidth.

14. The method of claim 13, wherein if the main frequency is equal to greater than a predetermined maximum frequency, then the scanning method is terminated.

\* \* \* \* \*